(No Model.)
D. B. STEPHENS.
SOFT TREAD NAILLESS HORSESHOE.
No. 592,261. Patented Oct. 26, 1897.
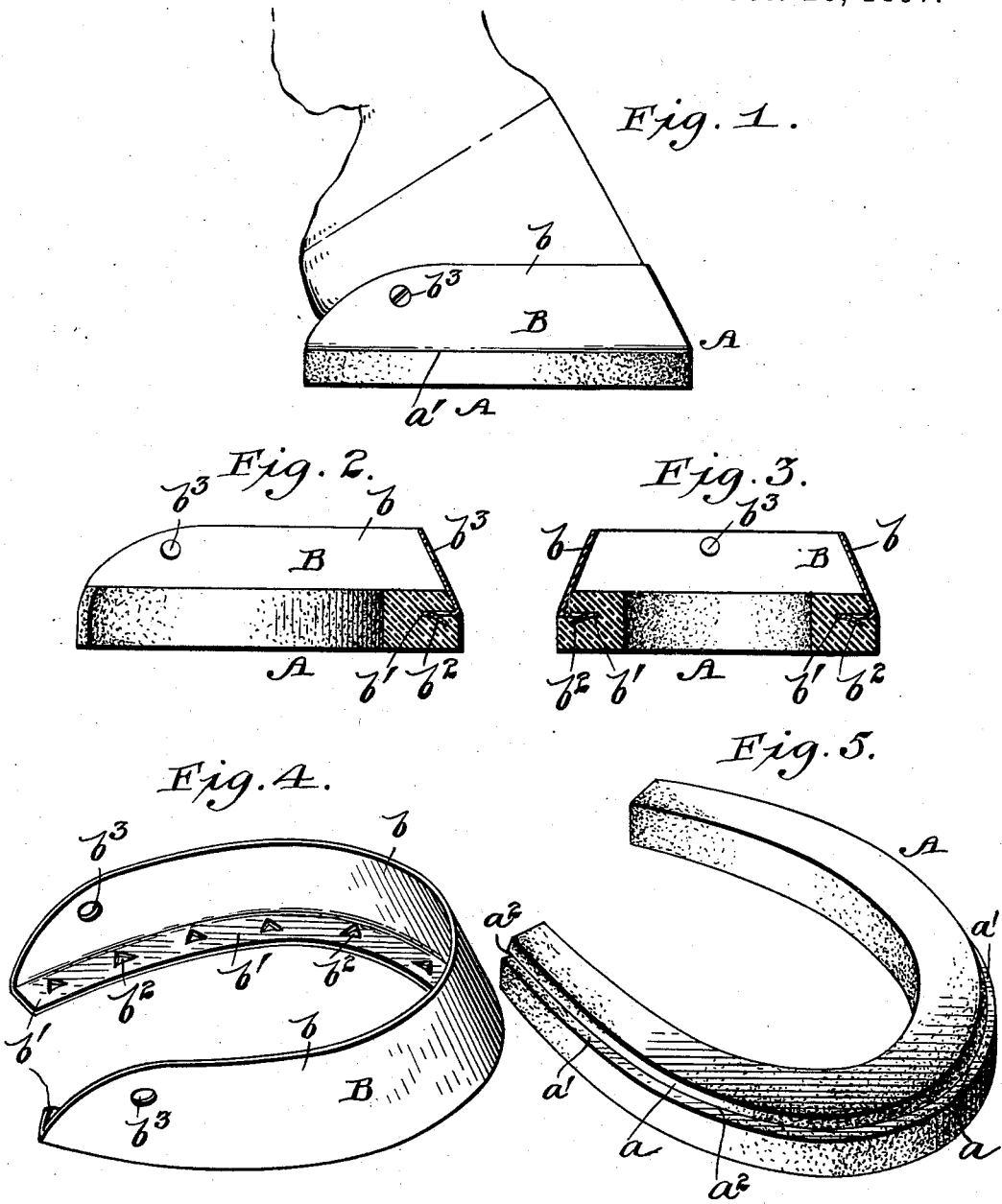
WITNESSES
INVENTOR

UNITED STATES PATENT OFFICE.

DABNEY BALL STEPHENS, OF DULUTH, MINNESOTA, ASSIGNOR, BY DIRECT AND MESNE ASSIGNMENTS, OF NINE-SIXTEENTHS TO WILLIAM BERNARD TOPHAM AND JAMES GEORGE HARRIS, OF SAME PLACE.

SOFT-TREAD NAILLESS HORSESHOE.

SPECIFICATION forming part of Letters Patent No. 592,261, dated October 26, 1897.

Application filed February 3, 1897. Serial No. 621,815. (No model.)

*To all whom it may concern:*

Be it known that I, DABNEY BALL STEPHENS, a citizen of the United States, residing at Duluth, in the county of St. Louis and State of Minnesota, have invented certain new and useful Improvements in Horseshoes; and I do hereby declare the following to be a full, clear, and exact description of the invention, such as will enable others skilled in the art to which it appertains to make and use the same.

My invention relates to horseshoes formed of a solid-rubber base or tread portion and a spring attaching portion for attaching the horseshoe to the horse's hoof; and it consists of the novel construction of the shoe and of the manner of attaching the rubber base or tread portion to the spring attaching portion without the use of cement or other auxiliary securing means and which will at the same time be capable of being separated when the rubber base or tread portion is worn out, so as to be replaced by a new one.

In the accompanying drawings, Figure 1 is a side elevation of a portion of a horse's foot with my improved shoe applied to the same. Fig. 2 is a vertical longitudinal section through the improved shoe. Fig. 3 is a vertical transverse section through said shoe. Fig. 4 is a detail perspective view of the spring attaching portion, and Fig. 5 is a detail perspective view of the rubber base or tread portion.

A in the drawings represents my improved horseshoe, which comprises in its construction a base or tread portion constructed of a solid piece of rubber and shaped in the form of a horseshoe. This base is cut away vertically about one-third its depth on its outer surface near its upper edge entirely around the periphery of the same, as at $a$, and forms a supporting and guiding shoulder $a'$. A laterally inwardly extending groove or kerf $a^2$ is formed in the base in a plane with the shoulder $a'$ and extends entirely around the outer surface of the base. The portion of the base above the kerf or groove is solid and forms an integral part of the rubber base. The groove $a^2$ is intended to receive a spring attaching portion, as will be hereinafter described, and the shoulder $a'$ serves for guiding the spring attaching portion into the groove in the base and is a means of supporting said attaching portion firmly on said base.

B represents a spring attaching portion, which is made to conform to the outline of a horse's hoof and is of the same length as the rubber base portion A. This spring attaching portion consists of an upwardly-extending converging wall $b$ and an inwardly-extending horizontal flange $b'$ at its lower end. The flange $b'$ is provided with downwardly-extending penetrating teeth $b^2$, which are formed, preferably, by punching the metal constituting the attaching portion outwardly, and the converging wall $b$ is preferably provided with holes $b^3$ at suitable distances apart for the reception of nails or screws, as additional means for securing the spring attaching portion to the horse's hoof. By constructing the attaching portion B of spring metal and forming it approximately to the contour of the horse's hoof it can be readily sprung onto the hoof, and surrounding as it does the entire hoof its converging walls will snugly fit the hoof, but at the same time allow a natural expansion of the hoof, thereby preventing narrow heels, and by using the additional nails or screws referred to the shoe will be free from any liability of slipping off.

In securing the spring attaching portion to the rubber base the spring attaching portion is sprung sufficiently apart to allow the horizontal flange $b'$ thereof to enter the groove $a^2$, and the shoulder $a'$ will guide the movement of the attaching portion as the said flange is slid into the groove. The penetrating teeth $b^2$ will become embedded in the rubber, which latter is of a consistency to receive the teeth and prevent the flange from springing laterally out of the groove. The shoulder $a'$ extending entirely around the rubber base portion and the horizontal flange $b'$ on the spring attaching portion extending entirely around the said attaching portion and resting and secured in the groove $a^2$, which also extends entirely around the rubber base portion, forms a firm support and solid means of attachment for the spring portion to the rubber base portion.

When the rubber base portion is worn out, the same can be removed and be replaced by a new base portion without having to throw away the spring attaching portion.

In addition to the advantages set forth in the aforegoing specification it will be observed that a horse provided with these shoes will not be so much jarred in traveling on concrete or stone pavements as with the use of iron shoes and that these shoes prevent the cutting of the horse's feet from calking and lessens the liability of injury to man or animal from being kicked and also prevent the horse from slipping and corns from forming on the feet.

It will also be observed that the under side of the horse's hoof rests squarely upon the rubber base portion and not upon an iron plate, as in some constructions of shoes provided with rubber tread portions.

Having now described my invention, what I claim as new, and desire to secure by Letters Patent, is—

1. A horseshoe comprising in its construction a base portion constructed of a single piece of solid rubber made in the shape of a horseshoe and provided on its outer surface near its upper edge with a shoulder and a horizontally-extending groove which extend entirely around the base portion, and a spring attaching portion constructed of a single piece of metal which conforms to the shape of the base portion and to the contour of the horse's hoof and is provided with an inwardly-extending flange around its entire lower edge which flange fits in the groove in the base portion and rests upon the shoulder of the same, the construction and arrangement being such that the bottom of the horse's hoof comes in direct contact with the rubber base portion, substantially as described.

2. A horseshoe comprising in its construction a base portion constructed of a single piece of solid rubber made in the shape of a horseshoe and provided with a shoulder and a groove which extend entirely around the base portion, and a spring attaching portion conforming to the shape of the base portion and to the contour of the horse's hoof and provided with an inwardly-extending flange around its entire base which fits in the groove in the base portion and rests upon the shoulder of the same, and penetrating teeth formed on the under side of the inwardly-extending flange on the spring attaching portion, which engage the rubber base and prevent said attaching portion from springing outward, and means for attaching the shoe to the horse's foot, substantially as described.

In testimony whereof I hereunto affix my signature in presence of two witnesses.

DABNEY BALL STEPHENS.

Witnesses:
JAMES T. WATSON,
JNO. RUSTGARD.